United States Patent [19]

Hunter

[11] Patent Number: 4,682,440

[45] Date of Patent: Jul. 28, 1987

[54] ANIMAL TRAP

[76] Inventor: Robert F. Hunter, 119 Bowie St., Abbeville, S.C. 29260

[21] Appl. No.: 942,616

[22] Filed: Dec. 17, 1986

[51] Int. Cl.⁴ .......................................... A01M 23/18
[52] U.S. Cl. ....................................................... 43/61
[58] Field of Search ...................................... 43/60, 61

[56] References Cited

U.S. PATENT DOCUMENTS

| 812,472 | 2/1906 | Alsobrook | 43/61 |
| 1,297,893 | 3/1919 | Nash | 43/61 |
| 3,483,652 | 12/1969 | Hanlan | 43/61 |
| 4,179,835 | 12/1979 | Hunter | 43/61 |

Primary Examiner—M. Jordan
Attorney, Agent, or Firm—Bailey & Hardaway

[57] ABSTRACT

A simplified and effective trap for small animals is illustrated utilizing positive linkage means for dislodging or actuating a trip mechanism to permit a cage door to fall by gravity and utilizing a gravity actuated latch for locking the door in lowered closed position.

4 Claims, 4 Drawing Figures

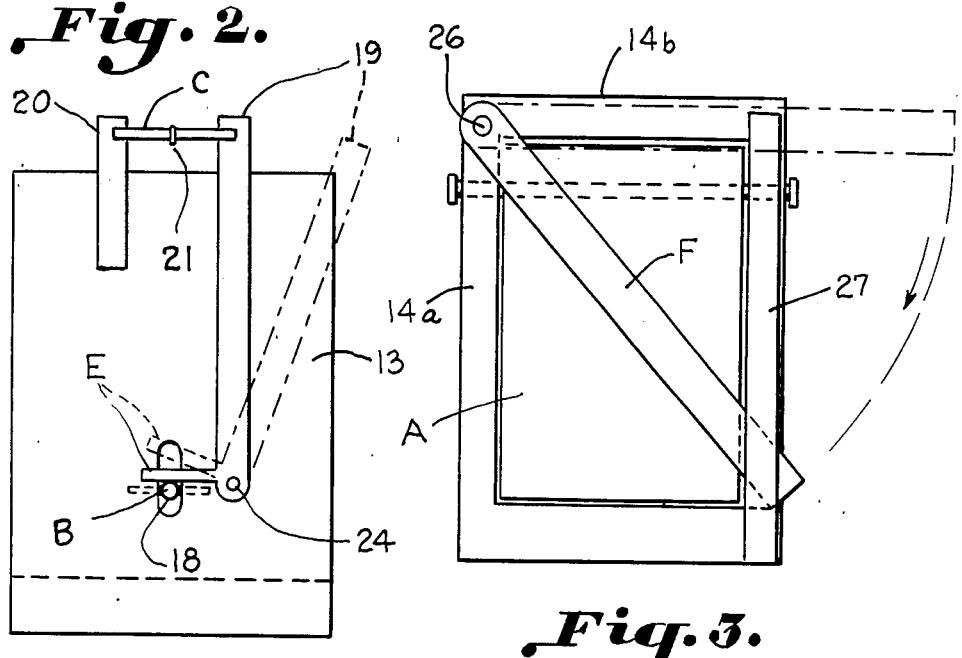
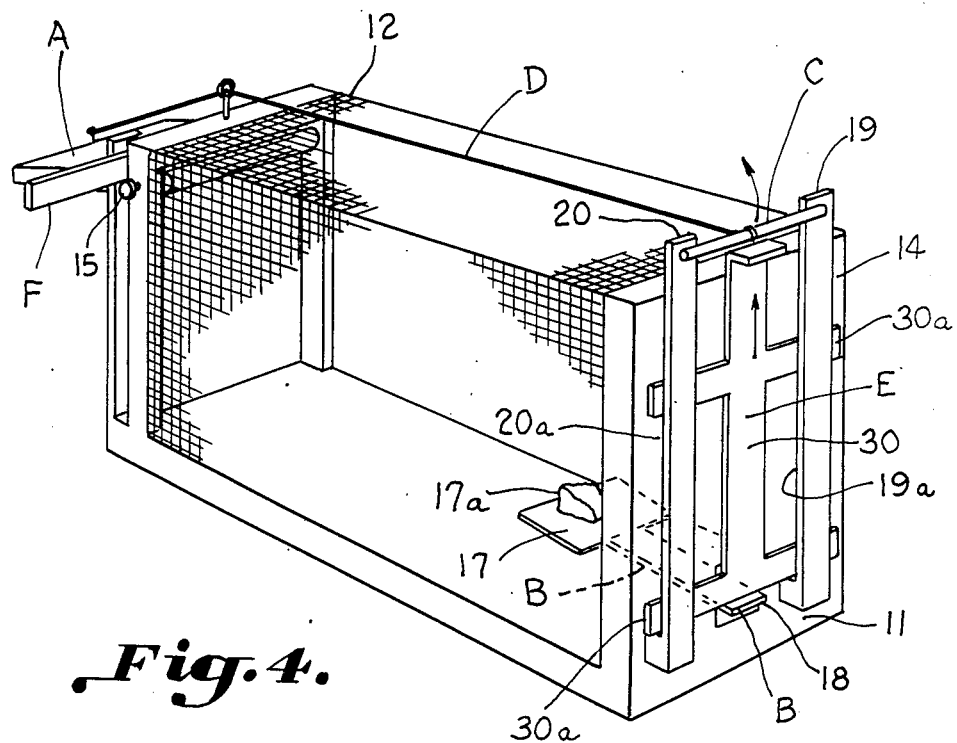

ANIMAL TRAP

BACKGROUND OF THE INVENTION

This is an improvement upon the invention of U.S. Pat. No. 4,179,835 which illustrates a gravity actuated door held in raised position by a trip rod secured between vertical posts on a rearward extension of the trap beyond a back wall. The extension beyond the back wall added to the complexity and cost of traps constructed in accordance with the patent and took up space while subjecting the trap to the danger of accidental dislodgement of the trip rod.

In addition to the foregoing patent, some animal traps are disclosed in U.S. Pat. Nos. 844,517, 1,990,861, 2,038,068, 2,502,836, 2,793,464, and 3,975,857.

SUMMARY OF THE INVENTION

It has been found that a simplified less expensive animal trap may be constructed with means assuring locking of a trap door when in closed position by providing a positive linkage means for actuating a trip rod held between upright posts through actuation of a pivoted lever extending into the cage carrying bait on one end and extending rearwardly on a spaced opposite second end outside the trap for actuating linkage means. A gravity operated linkage means is provided which falls when the door is in closed position for locking of the door against opening by the animal trapped inside the cage.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2 is a rear elevation illustrating positively operated linkage means releasably carrying the trip rod permitting the door of the cage to close, FIG. 3 is a rear elevation illustrating a gravity operated latching means for the front door of the cage, and FIG. 4 is a perspective view illustrating an alternate form of the trip means utilizing a vertical movable link for positively dislodging a trip rod.

DESCRIPTION OF A PREFERRED EMBODIMENT

Figure 1:
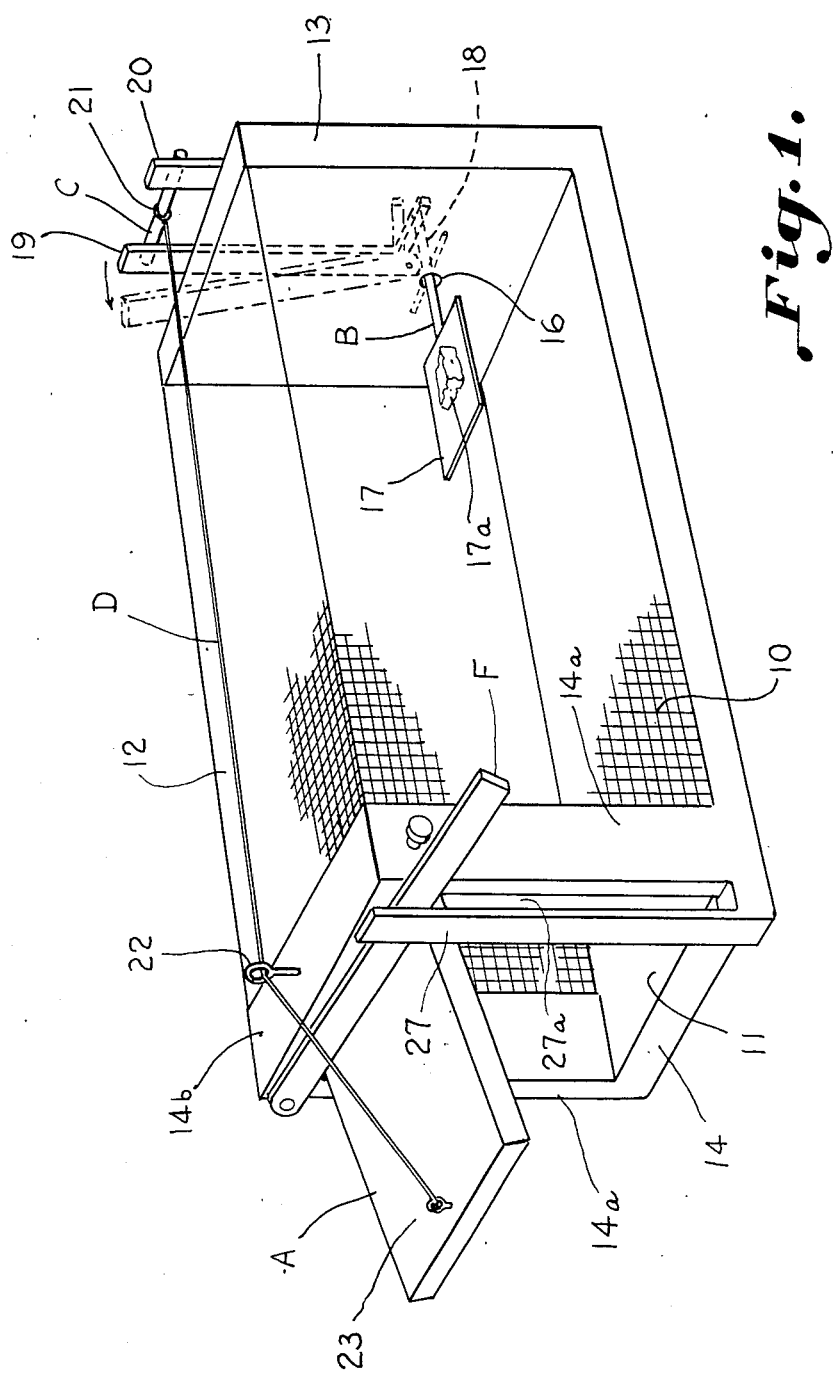
FIG. 1 is a perspective view illustrating a small animal trap constructed in accordance with the present invention wherein positively operated linkage means are provided for releasing the gravity operated front door permitting it to fall into closed position with gravity operated latch means.

The drawings illustrate a small animal trap having a cage with a bottom, a top, a back, an open front and sides joining the top, bottom and back. A trap door A is hingedly affixed to the top of the cage at the front thereof, the trap door having a front bottom edge. A pair of vertical or upright posts are carried exteriorly and rearwardly of the cage by the back of the cage. A lever B is pivotally mounted in the back of the cage at the center of the lever and balanced therein, the lever having a first end in the cage with a tray thereon for bait and a spaced opposite second end movably positioned between the pair of posts. A trip rod C extends between the pair of posts. A cord D has a first end affixed adjacent the front bottom edge of said trap door and a spaced opposite second end affixed to the trip rod. Linkage means E is moved responsive to movement of the opposite second end of said lever dislodging said trip rod from between the posts permitting the door to fall due to gravity. Gravity operated linkage means F are pivoted on one end adjacent an upper edge of the front of said cage above the front door supported in raised position by the door when raised but pivoted downwardly to lock the door when in lowered position.

The animal trap has a cage formed with wire mesh 10 including a bottom 11, together with a top 12, and a back 13, and a rectangular open front 14 with wire sides joining the top, bottom and back. A pivoted trap door A acts as a closure for the cage.

A lever B extends through an opening 16 in the rear or back of the cage carrying a bait receiving tray 17 on a first end and a spaced opposite second end 18 extending rearwardly beyond the back of the cage.

A trip rod C extends horizontally between the pair of upright spaced posts 19 and 20. The trip rod C has a string or cord D attached as at 21 in the medial portion thereof and passes above the top of the cage and through an eyelet guide member 22 carried in an upper frame member 14b forming an opening in front of the cage and thence forwardly and downwardly to a second eyelet 23 adjacent the lower edge of the trap door A.

The linkage means E in FIG. 2 is provided in the form of a bell crank extending inwardly from a lower end of the post 19. The post 19 is pivoted as at 24 and is movable to dotted line position in FIG. 2 by raising of the spaced opposite second end 18 responsive to an animal taking the bait 17a carried by the bait tray 17.

The trip rod C is dislodged between the posts, and the trap door A falls by gravity to the closed position shown in FIG. 3. The gravity operated linkage means F is pivoted on one end as at 26 adjacent an upper edge of the front of the cage above the door. The linkage means F is thus supported in raised position when the door is open as in FIG. 1 and falls by gravity to lock the door when the door is in lowered position as in FIG. 3. A vertical member 27 provides a slot 27a for supporting the linkage means F when in raised and lowered position.

An alternate form of the invention is illustrated in FIG. 4 wherein opposed vertical slots 19a and 20a are provided for guiding a vertical linkage means E in the form of an upright member 30 which has vertically spaced lateral projecting levers 30a extending into the slots 19a and 20a for guiding the vertical means when raised by the spaced opposite second end of the lever B for dislodging the trip rod C.

The particular embodiment of the invention illustrates the doors normally supported in open position between cord D which is attached to the trip rod C. The trip rod is held against the spaced vertical posts by the tension of the cord. In the embodiment of the invention illustrated in FIGS. 1 and 2 the lower linkage portion of the post is substantially L-shaped, and the post is pivoted to broken line position in FIG. 2 by the action of the animal causing the rearwardly end of the lever B to raise the linkage dislodging the trip rod C from between the posts. This permits the door to fall of its own weight and become locked by latching means F as illustrated in FIG. 3. In the alternate form of the invention a vertical sliding linkage means is provided for dislodging the trip rod C.

While a preferred embodiment of the invention has been described using specific terms, such description is for illustrative purposes only, and it is to be understood that changes and variations may be made without departing from the spirit or scope of the following claims.

That which is claimed is:

1. A small animal trap having a cage with a bottom, a top, a back, an open front and sides joining the top, bottom and back, said small animal trap comprising:

a trap door hingedly affixed to the top of the cage at the front thereof, said trap door having a front bottom edge;

a pair of upright posts carried exteriorly of the back of the cage;

a lever pivotally mounted in the back of said cage at the center of the lever and balanced therein, said lever having a first end in the cage with a tray thereon for bait and a spaced opposite second end movably positioned between the pair of posts;

a trip rod extending between said first pair of posts;

a cord having a first end affixed adjacent the front bottom edge of said trap door and a spaced opposite second end affixed to said trip rod; and linkage means moved responsive to movement of said opposite second end of said lever dislodging said trip rod from between said posts.

2. The structure set forth in claim 1 including gravity operated linkage means pivoted on one end adjacent an upper edge of the front of said cage above said front door supported in raised position by said door when raised but pivoted downwardly to lock said door when in lowered position.

3. The structure set forth in claim 1 wherein said linkage means is movable vertically responsive to movement of said second end of said lever to pivot one of said posts laterally releasing said trip rod from between said posts.

4. The structure set forth in claim 1 wherein said linkage means is slidable vertically responsive to movement of said second end of said lever releasing said trip rod from between said posts.

* * * * *